UNITED STATES PATENT OFFICE.

CHESTER J. RANDALL, OF NAUGATUCK, CONNECTICUT, ASSIGNOR TO THE GOODYEAR'S METALLIC RUBBER SHOE COMPANY, A CORPORATION OF CONNECTICUT.

PREPARATION OF AND THE MIXING OF PIGMENTS WITH RUBBER AND THE LIKE.

1,405,439. Specification of Letters Patent. Patented Feb. 7, 1922.

No Drawing. Application filed March 24, 1917. Serial No. 157,128.

*To all whom it may concern:*

Be it known that I, CHESTER J. RANDALL, a citizen of the United States, residing at Naugatuck, county of New Haven, and State of Connecticut, have invented certain new and useful Improvements in the Preparation of and the Mixing of Pigments with Rubber and the like, of which the following is a full, clear, and exact description.

This invention relates to the preparation of and the mixing of pigments with rubber and the like, and has for an object to prevent dispersion of pigment into the atmosphere during the mixing operation, to shorten the mixing period, and to provide a pigment mixture which will produce desired characteristics in the rubber product without impairing the quality of the product.

A pigment is usually mixed with rubber being worked by the rolls of a mill, and is usually added to the rubber in the form of a powder. In this form it exhibits particles isolated from each other by air which tends to permit the particles to easily be dispersed into the atmosphere and discolor different rubber stock which may be undergoing treatment nearby. Further, the quantity of pigment required to impart desired characteristics of color, quality, etc., to the rubber, is of so great mass or bulk in powder form as to cause it to mix very slowly with the rubber. Thus an abnormally long milling period is required to produce a homogeneous product. The addition of an adhesive substance to the pigment during the mixing operation has been tried, for the purpose of binding together the particles of the pigment so that they cannot fly from the mill rolls, and also to reduce the bulk of the pigment and thereby shorten the mixing period. But this expedient while partly accomplishing the purpose in view, cannot always be resorted to with impunity, for the quantity of binder usually required is so great as to materially impair the quality of and in some instances even to spoil the rubber product.

In order to remedy the above disadvantages, the present invention consists, in part, of changing the physical state of a pigment from a loose easily dispersable powder to a compact mass, from which dispersion of particles into the atmosphere during the mixing operation cannot occur. This new product has about one-quarter the mass or bulk of the pigment in its original powder condition, and the small bulk of the pigment permits of it being quickly assimilated by the rubber with consequent shortening of the mixing period. Further, in this new product, the ratio of the binder to the pigment is such that subsequent incorporation of the mixture into the rubber will produce desired characteristics of color, quality, etc., without sacrificing other desired characteristics in the rubber.

One embodiment of the invention will be described in connection with the compounding of rubber with black pigment, such as lamp black. Liquid tar has been sometimes added to lamp black on the mill rolls to bind together and prevent the particles of pigment from dispersion into the atmosphere. However, the smallest proportion of tar and lamp black that can be mixed in this way is about two parts of tar to one part of lamp black. This quantity of tar is far in excess of that actually required to bind the particles together and is in fact so large as to materially impair the quality of the rubber product. Further, greater difficulty is experienced in getting such a mass of tar to uniformly permeate the rubber throughout. To overcome these disadvantages, I initially produce a homogeneous mixture of tar and lamp black, in the proportion of about one part of tar to about four or more parts of lamp black, and subsequently incorporate this product with the rubber.

The process in its preferred form is as follows:

A weighed quantity of lamp black is put into a mixing and kneading machine of the usual and well known type, with about one-quarter of its weight in liquid tar. I then add enough naphtha or similar solvent for tar to moisten the whole mass. The mixing machine is then started and during the mixing operation the dissolved tar is evenly distributed through the mass of lamp black. After the mixing machine is run for a sufficient period to accomplish a thorough saturation of the lamp black by the dissolved tar, steam is admitted to the steam jacket of the mixing machine, and the naphtha is distilled off and recovered in a condenser for further use.

The product of the above described preliminary treatment is in the form of a granular mixture, consisting of small pellets ranging in size from material in powdered form to lumps the size of a walnut or larger, and which occupies about one-quarter of the space the lamp black alone originally did in the form of a dry powder. The small particles of the product are stuck together sufficiently to prevent their dispersion under ordinary agitation but are capable of being readily broken up and quickly worked into the rubber during the mixing of the same on the rolls of the mill. These rolls may be heated in the usual way.

Although I have described a specific embodiment of the invention I do not intend to limit the scope of the invention thereto, and I desire it to be understood that wherever lamp black is mentioned in the specification and claims, the words carbon black may be substituted, and that whatever applies to lamp black in this disclosure applies also to the use of carbon black as an equivalent.

Having thus described my invention, what I claim and desire to protect by Letters Patent is:

1. The process of compounding rubber, comprising mixing with the same a mass of pigment in which the particles are bound together by a binder disseminated uniformly throughout the mass of the pigment.

2. The process of compounding rubber, comprising mixing with the rubber, lamp black in the form of a mixture in which the particles are bound together by tar substantially uniformly disseminated throughout the mass of lamp black.

3. The process consisting of forming a fluid mass of tar, a solvent therefor and a pigment, changing the mass to a substantially granular mixture by removal of the solvent, and incorporating the product in rubber.

4. The process consisting of forming a fluid mass of pigment, a binder for the pigment and a solvent for the binder, heating the mixture to evaporate the solvent, and incorporating the product in rubber.

5. The method of compounding a plastic substance with an impalpable powder which consists in causing a concretion of the powder into dry, granular or lumpy form, and then mixing it with the plastic substance.

6. The method of compounding rubber with a substance normally existing as an impalpable powder which consists in wetting the powder and drying it to produce a friable, granular or lumpy condition, and incorporating the dry, granular substance with rubber.

7. The method of compounding rubber with lampblack which consists in wetting the powdered lampblack to concrete it, and drying the same, bringing it to a condition of friable grains or lumps, and incorporating the dry, granular lampblack with the rubber on a heated mixing mill.

8. The method of compounding a plastic substance with an impalpable powder which consists in mixing the powder with a concreting and binding liquid, drying the same, producing a condition of friable grains or lumps, and mixing it with the plastic substance.

Signed at Naugatuck, Conn., this 12th day of March, 1917.

CHESTER J. RANDALL.